(12) United States Patent
Ostertag et al.

(10) Patent No.: US 6,645,286 B2
(45) Date of Patent: *Nov. 11, 2003

(54) IRON EFFECT PIGMENTS

(75) Inventors: Werner Ostertag, Grunstadt (DE); Stefan Trummer, Nuremberg (DE); Frank Henglein, Nuremberg (DE); Klaus Greiwe, Lauf (DE)

(73) Assignee: Eckart GmbH & Co. KG, Fürth (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/103,762

(22) Filed: Mar. 25, 2002

(65) Prior Publication Data

US 2002/0169244 A1 Nov. 14, 2002

(30) Foreign Application Priority Data

Mar. 23, 2001 (DE) .......................................... 101 14 446

(51) Int. Cl.⁷ ................................................. C09C 1/22
(52) U.S. Cl. ........................ 106/460; 106/403; 106/415; 106/417; 106/418; 106/439; 106/456
(58) Field of Search ................................. 106/403, 415, 106/417, 418, 439, 456, 460; 428/400 S

(56) References Cited

FOREIGN PATENT DOCUMENTS

| DE | 44 14 079 A1 | 10/1995 |
| DE | 44 37 753 A1 | 4/1996 |
| DE | 198 34 236 A1 | 2/2000 |
| EP | 0 673 980 A2 | 9/1995 |
| EP | 0 947 266 A1 | 10/1999 |

Primary Examiner—C. Melissa Koslow
Assistant Examiner—Shalie Manlove
(74) Attorney, Agent, or Firm—Browdy and Neimark, P.L.L.C.

(57) ABSTRACT

The present invention is concerned with soft-magnetic iron effect pigments with metallic luster, which are produced by grinding reductively treated carbonyl iron powder, and which are passivated either during grinding or subsequent to the grinding. The products find application in the decorative and functional fields in paint and lacquer coatings, coloring of plastics, in printing, cosmetics, and glass and ceramics.

19 Claims, 3 Drawing Sheets

Scanning electron microscope image of Fe flakes from carbonyl iron at a magnification of 5000 times

[Text inside image:]

[Scale] 20 μm

Fe flakes from carbonyl iron

Fig. 1: Scanning electron microscope image of Fe flakes from carbonyl iron at a magnification of 5000 times
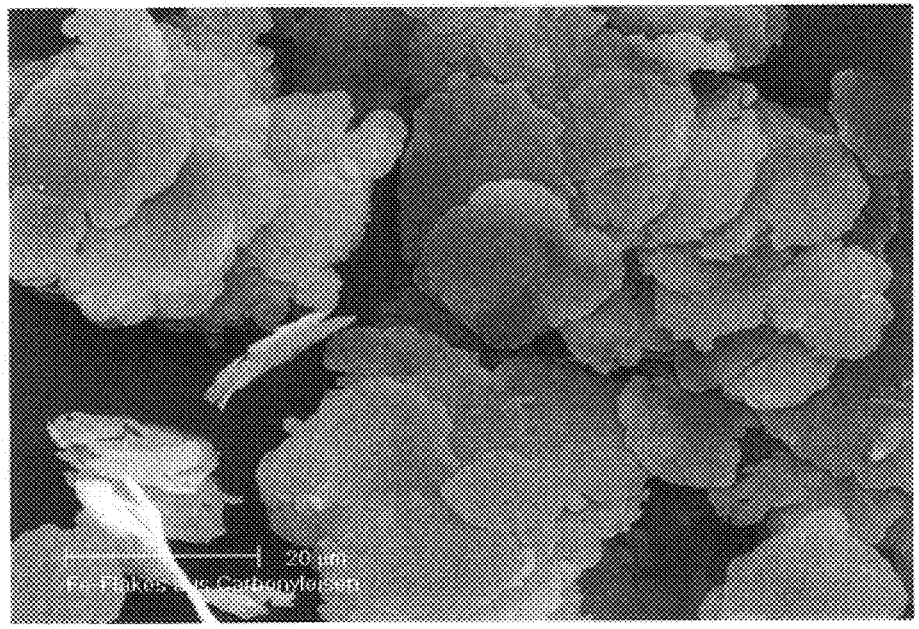

Fig 2: Scanning electron microscope image of Fe flakes from carbonyl iron at a magnification of 20000 times
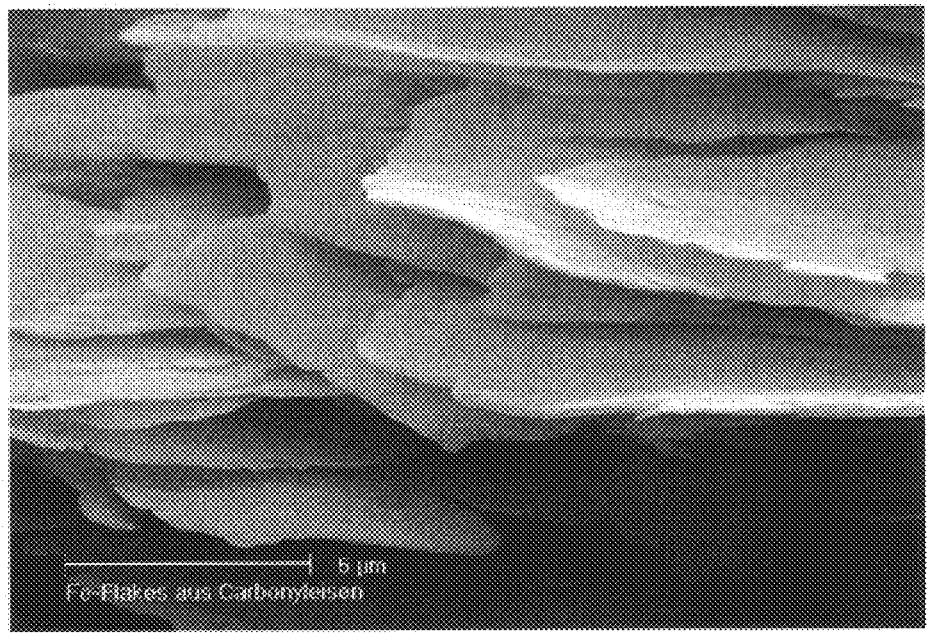

Fig. 3: Flop behavior of fine iron pigment from carbonyl iron in comparison to aluminum pigment.
[Translation of text for chart:]
    [Title:]             Comparison Fe and Al Pigment
    [Text inside image:]      Fe pigment
                                  Al pigment (MEK 2156)
    [Vertical axis:]     L*
    [Horizontal axis:]  Angle of difference [°]
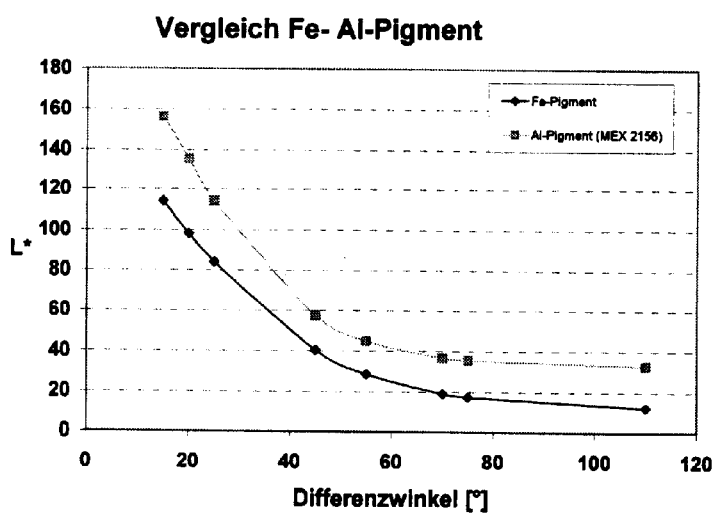

IRON EFFECT PIGMENTS

BACKGROUND OF THE INVENTION

1. Field of the Invention

The present invention is directed to an iron effect pigment.

2. Background Art

Flakes of iron are produced according to the current standard technology from granular iron, which is obtained by atomizing molten iron. The pigment production takes place by means of crushing or milling processes whereby the granules are reduced to small pieces and deformed. As with all metal pigment production methods, lubricants are added in the process to prevent cold welding of the pigment particles. The standard technology for producing flake shaped iron pigment is described in detail in examples 1 and 8 in EP 0673 980. The shortcomings of that production process lie in the fact that granular iron that is produced by atomizing is always relatively coarse and has a wide particle size distribution. As a result, only relatively large flakes can be produced from granular iron produced by atomizing. Flakes in the preferred range for effect pigments of 6 to 36 $\mu$m can be obtained only through energy extensive and lengthy grinding processes, or one has to limit oneself to using sieve fractions before and/or after the grinding. This makes their production unprofitable. The shape of the iron flakes that are obtained by atomizing is irregular, with rough surfaces and frayed edges, which results in a relatively low optical quality due to a greater number of light-scattering centers.

Metal flakes of high optical quality can be obtained by grinding only if the grinding process is performed so gently that the granules are merely deformed and not reduced in size. The prerequisite for such a gentle grinding is a high ductility of the metal granules, which is present in aluminum, for example. As is well known, aluminum flakes of a particularly high optical quality can be produced by using granules of spherical morphology. If these granules are merely deformed and not reduced in size during the grinding, flakes are obtained that have round edges and a smooth surface (so-called "silver dollars"). Because of their regular shape, due to the lesser light scattering when applied in a coating, these pigments have a significantly more directed reflection of incoming light than pigments of a comparable size distribution that, however, were obtained from shapeless granules and/or by reduction in size.

Optically even superior metal pigments can be produced by physical vapor deposition (PVD) processes. In this alternate technology, metal films are deposited onto substrates in the vacuum and subsequently removed and pulverized. Those pigments, however, are disproportionately expensive and, with the exception of aluminum, have so far found no application. Iron flakes that could possibly be produced according to that method have been left out of account within the framework of this invention.

Flakes from iron alloys, such as alloyed special steel—or Hastalloy—flakes are also not an object of the present invention. They generally lack the specific shade and luster of iron. Furthermore, iron alloys usually display a less favorable ductility and a lesser or no utilizable magnetism.

BRIEF DESCRIPTION OF THE DRAWINGS

FIG. 1 is a scanning electron microscope image of iron flakes from carbonyl iron at a magnification of 5000.

FIG. 2 is a scanning electron microscope image of iron flakes from carbonyl iron at a magnification of 20,000.

FIG. 3 shows flop behavior of fine iron pigment from carbonyl iron in comparison to aluminum pigment.

SUMMARY OF THE INVENTION

The present invention focuses on unalloyed iron. The goal of the invention was to develop a high-luster, soft-magnetic effect pigment with the typical coloring of iron that is available in a passivated form. The manufacturing process shall be guided in such a way that the deformation and not the reduction in size plays the main role in the grinding phase. The effect pigment should find use in the decorative but also in the functional field, in coatings, plastics, printing, cosmetics, and in glass and ceramics.

Surprisingly, it has now been found that when carbonyl iron powder is used as the starting material, iron flakes can be produced by grinding in a size that is particularly desirable for automobile paints, and in a "silver dollar" shape that is known from aluminum. Furthermore, with an appropriately gentle grinding process, the size-to-thickness ratio can be adjusted in a surprisingly controlled manner. Carbonyl iron powder that has been treated in a reducing manner is characterized by a particularly high degree of purity, ductility, small particle size, spherical morphology and narrow particle size distribution. The effect pigments of soft iron display ferromagnetic behaviors and, when used in an application, can be oriented in the magnetic field, which produces very impressive patterns that appear three-dimensional to the human eye.

The product and process development for the present invention are aimed at eliminating the iron atomizing process as well as the reduction in size of the granular iron obtained by atomizing. It is, in fact, impossible, even with the most modern nozzle technology, to produce starting granules for the grinding process that come even close to attaining the positive properties comparable to carbonyl iron powder that are necessary for the production of iron effect pigments in a "silver dollar shape". If one wants to avoid the size reduction process in the milling of granular iron, an average particle size of 1 to 15 and preferably 2 to 8$\mu$ in the base product will be required for a final product with an average flake diameter of 6 to 36$\mu$. The base product should have a narrow particle size distribution, which is the case with carbonyl iron powder.

Carbonyl iron powder is produced by decomposition of vapor-state iron pentacarbonyl $Fe(CO)_5$ in cavity decomposers (see leaflet by BASF AG, Ludwigshafen, RCA 3210, 0686-2.0, FIG. 1) and is available commercially (BASF AG, Ludwigshafen, as well as ISP, Wayne, N.J.). However, these powders initially have a relatively high grain hardness and contain up to 1.5% carbon, approximately 1% oxygen and up to 1% nitrogen. Their iron content is around 97%. If these powders are subjected to a treatment at an increased temperature in a hydrogen flow or in a hydrogen-containing atmosphere, the so-called "reduced carbonyl iron powder" is obtained, which is characterized by an iron content of over 99.5% and a high ductility, and which is particularly suitable as a starting product for grinding for the production of iron effect pigments. Reduced carbonyl iron powder is also available commercially (BASF AG, ISP). The powders are currently used in the field of powder metallurgy, for medical purposes, and in the production of electronic components.

The use of reduced "carbonyl iron power" with an average particle size of 0.5 to 15 $\mu$m, preferably 1 to 10 $\mu$m, and the narrow grain size distribution that is typical for carbonyl iron powder, permits the production of iron flakes with a high degree of luster and a specifically adjustable diameterto-thickness ratio (shape factor), and a shape resembling the "silver dollar" shape of aluminum pigments.

The nano/microhardness of reduced granular carbonyl iron was measured in comparison with granular aluminum (purity 99.7%). The determination was performed using a Hysitron TriboScope™ based on sections embedded in epoxy resin. Carbonyl iron powder showed a three times lesser nano/microhardness (0.61 GPa) than the granular aluminum (1.85 GPa).

The lower microhardness of carbonyl iron permits a relatively greater deformation of the granules as compared to the aluminum. This effect is of importance among other things for the covering power of metallic coatings. Aluminum pigments have a high specific covering power, not least due to their low density (2.7 g/cm$^3$). Metals with higher densities, such as brass, iron (7.87 g/cm$^3$), etc., are comparatively at a disadvantage. However, this disadvantage can be compensated for by a greater shape factor during the grinding of carbonyl iron powder.

The shaping of the particles in the course of the grinding process may take place dry or wet, i.e., in the presence of solvents such as white spirit, mineral oil, toluene, alcohols, chlorinated hydrocarbons, water, or mixtures of the same. The grinding medium may be steel balls with a size of 0.5 mm to 25 mm. Other grindings bodies, e.g., of ceramics or glass, may also be used. Wet grinding is preferred since it is gentler and permits an easy size classification of the ground product with decanters after the grinding step. Wet grinding furthermore permits the easy distribution of lubricants or inhibitor substances or anticorrosive agents throughout the entire ground product.

The mills can be agitating ball-type mills, edge mills, drum ball mills and other aggregates. Particularly preferred are revolving tubular ball mills. Specifically, the process for producing high-luster, soft-magnetic effect pigment is such that "reduced carbonyl iron powder" of a certain particle size is entered into a ball mill together with a solvent, such as for example, white spirit. To prevent cold welding, lubricants, such as oleic acid, stearic acid or also special inhibitor substances are added, the amount of which depends on the free specific surface area (BET) of the rolled iron pigments. Generally, 0.5 to 6% oleic acid or stearic acid are used relative to the weight of the iron powder. The grinding time is between 0.3 and 10 hours.

The passivation of the iron flakes may take place through addition of inhibitor substances and anticorrosive agents, either already during the grinding phase or through a corresponding coating subsequent to the grinding phase. After completion of the grinding and optional subsequent coating, the product is filtered, dried and subjected to a protective sifting. The flake shaped iron particles may optionally also be subjected to a size classification in the decanter prior to filtering and separated in the process according to different particle size fractions.

For dry grinding, "reduced carbonyl iron powder" is entered into a ventilated ball mill together with the lubricant, and optionally also with inhibitor substances, and ground. As with the wet grinding, the balls are composed of steel, ceramics or glass. The smaller the entered carbonyl iron powder, the smaller the balls may be. In practice, balls between 0.5 and 8 mm are normally used.

For an efficient deformation of the spherical particles of the carbonyl iron powder, the same must have the highest possible degree of purity. The reduction, i.e., the annealing of the carbonyl iron powder in a hydrogen-containing atmosphere must, therefore, result in powders that are depleted as much as possible regarding their carbon and nitrogen content.

The material properties of the reduced carbonyl iron powder must come as close as possible to those of soft iron, i.e., pure iron. For the efficient mechanical deformation in the ball mill, in particular, it is important that the particles have a hardness of less than 5.0 (Mohs' scale)—soft iron has a hardness of 4.5. The particles must be tough, ductile and polishable. The commercial "reduced iron carbonyl powders" generally meet this requirement profile. They have an iron content greater than 99.5%, carbon values $\leq 0.005\%$ and nitrogen values $\leq 0.01\%$. In their oxygen content they are below 0.4%, most of the time even below 0.2%. Metallic contaminants are present in the powders only in smallest quantities, such as nickel (0.001%), chromium (<0.015%) and molybdenum (<0.002%). The average particle sizes of the commercially available products extend from 1 $\mu$m to 10 $\mu$m (see technical leaflets regarding carbonyl iron powder by BASF and ISP). In the course of the reductive annealing of carbonyl iron powder, agglomerates are occasionally formed. However, these can easily be removed by customary methods (sifting, decantation).

By using commercially available reduced iron carbonyl powder, it is possible, depending on the selected average particle diameter of the charge, to produce flake shaped iron effect pigments with the average particle size of 3 to 60 $\mu$m, especially 6 to 36 $\mu$m. The diameter-to-thickness ratio of the flakes can be adjusted by varying the grinding time. A longer grinding time with otherwise identical conditions results in a higher diameter-to-thickness ratio. While it is possible, in principle, to set any diameter-to-thickness ratio between 5 and 500, diameter-to-thickness ratios between 40 and 400 are generally preferred.

The passivation of the flake shaped iron pigments is of particular importance since iron powder that has not been passivated can, in a finely distributed form, react violently with the oxygen in the air, even producing flames. In the presence of water there will be corrosion. Two general passivation approaches play a role, which can be used individually but also jointly: passivation through inhibitors and passivation through barrier layers of a chemical and physical nature. If inhibitors, because of their consistency, are also used as lubricants to prevent cold welding of the particles, they are preferably added already during the grinding process. Otherwise they are applied adsorbently onto the pigment after the grinding.

Barrier layers are applied chemically onto the pigment. This generally does not entail any change in the optical appearance of the pigment as the barrier layers are relatively thin (10 to 100 nm) and advantageously consist of a material with a low refraction index (<1.7) in order not to trigger any interference reflection.

The working mechanism of the passivation layers is complex. In the case of inhibitors it is usually based on steric effects. The majority of inhibitors thus has an orienting effect in the sense of "leafing" and "non-leafing" (floating up and not floating up in the medium).

The inhibitors are usually added in low concentrations in the order of magnitude of 0.1 to 6% relative to the weight of the carbonyl iron powder. The following may be used for the passivation of iron flakes:

Organically modified phosphonic acids of the general formula R—P(O)(OR$_1$)(OR$_2$) wherein R=alkyl (branched or unbranched), aryl, alkyl-aryl, aryl-alkyl, and R$_1$, R$_2$=H, C$_n$H$_{2n+1}$, with n=1–6. R$_1$ may be identical to or different from R$_2$.

Organically modified phosphoric acid and esters of the general formula R—O—P(OR$_1$)(OR$_2$) with R=alkyl (branched or unbranched), aryl, alkyl-aryl, aryl-alkyl and $R_1$, $R_2$=H, $C_nH_{2n+1}$, with n=1–6.

Pure phosphonic acids or esters may be used, or phosphoric acids or esters, or mixtures of various phosphonic acids and/or esters, or mixtures of various phosphoric acids and/or esters, or any mixture of various phosphonic acids and/or esters with various phosphoric acids and/or esters.

Also mentioned should be the substance class of the oxygen, sulfur and nitrogen containing heterocycles, which include inhibitors such as mercapto-benzthiazolyl-succinic acid, furthermore sulfur/nitrogen-containing heterocycles such as thiourea derivatives, furthermore aliphatic and cyclic amines, including zinc salts of aminocarboxylates, or polymeric amine salts with fatty acids. Additionally, higher ketones, aldehydes and alcohols (fatty alcohols), thiols, b-diketones and b-keto esters may be used as well, furthermore organically modified silanes and a multitude of longer-chained, unsaturated compounds. Also mentioned should be fatty acids, longer-chained mono and dicarboxylic acids and their derivatives. These include, among others, oleic acid and stearic acid. Inhibitors usually show a very low solubility in the solvent during the wet grinding.

The passivation by means of anticorrosive protection barriers with chemical and physical protection mechanisms can be implemented in many ways. The barrier effect of the anticorrosive coating may be improved, for example, through the action of phosphoric acid, phosphorous acid, molybdate-containing, phosphor-containing and silicon-containing heteropolyacids, chromic acid, boric acid and other known anticorrosive agents as they are described, for example, in Farbe und Lack (1982), pages 183–188. Oxide layers, such as $SiO_2$, $ZrO_2$, $Cr_2O_3$ or $Al_2O_3$ or mixtures of the same may also be formed. Preferred are $SiO_2$ layers with layer thicknesses of 20 to 150 nm that are prepared according to sol-gel methods.

Flake shaped iron effect pigment has a use not only in the decorative field (coatings, plastic coloring, printing, cosmetics) where the average special optics of iron flakes are of importance.

Based on the electric conductivity and high magnetic permeability of iron flakes, there are numerous specific applications over and above that in the functional field, such as in security printing. Iron flakes can furthermore be used as a product in the production of complex, multi-layer effect pigments, such as for example, interference reflection pigments or optically variable pigments.

The invention will be described in more detail below with reference to the following examples, but without restricting it:

EXAMPLE 1

100 g reduced carbonyl iron powder by firm BASF AG Ludwigshafen with the designation "Carbonyleisenpulver CN", average particle size 5.5 µm.

(d10 value 3.5 µm, d90 value 15 µm), iron content 99.8% (C≦0.006%, NL<0.01%, O=0.18%) are entered into a ball mill of dimensions 30 cm×25 cm, which is half-filled with 1.5 mm diameter steel balls. Added to this are 0.56 liters white spirit and 2.8 g of a mixture of stearic acid and oleic acid. The mill is then closed and rotated for six hours at 56 revolutions per minute. The mill is subsequently emptied, the grinding product is washed with white spirit and separated from the grinding means by sifting (25 µm).

The obtained effect pigment displays a high degree of metallic luster and the magnetic permeability of soft iron powder. The following parameters were determined from laser beam refraction measurements (Cilas measurements) for the size distribution: $d_{90}$:27 µm, $d_{50}$:18 µm (average particle size) and $d_{10}$:10 µm, and the specific surface was determined based on BET measurements as 4 m²/g. In the appended FIG. 1, scanning electron microscope images of the pigments are shown, which reveal a relatively round edge shape of the pigments. The parameters of the size distribution, as well as the shape are typical for "silver dollar pigments".

From the appended FIG. 2 it is apparent that the pigments are rolled very thin. The thickness of individual iron flakes is approximately 100 nm, which is less than half of corresponding aluminum pigments.

The average thickness of the pigments was determined by means of a so-called spreading method: 0.2 g of the pigment powder are entered into a 5% solution of stearic acid in white spirit for 15 minutes. The stearic acid attaches to the pigment surface and imparts to the same a strongly hydrophobic character. Afterwards a small, defined quantity of the powder is sprinkled onto purified water in a "spreading pan". After careful stirring of the pigment film to better distribute the pigments, the same is spread by means of two metal wands on the water until a covering, shiny film develops. If this film is expanded too far, holes appear. If it is compressed too much, it takes on a wrinkled pattern. In this manner it is possible for a person with experience in the art to reproducibly create a "mono-layer" metal pigment film on the water. The surface of the spread film is measured. The specific surface is calculated from:

$$A_{spec} = 2 * \frac{\text{spread surface } [cm^2]}{\text{originally weighed-in quantity } [g]}$$

From this, the average thickness of the flakes can be calculated in nm:

$$\bar{d} = \frac{10^7}{A_{spec} * \delta_{Fe}}$$

A value of 146 nm was determined for the above-described sample.

If one disperses the flake shaped iron powder 30% in a cellulose nitrate lacquer solution and applies it with a spiral doctor knife, one obtains a coating with very high covering power, a metallic platinum-like luster and excellent flop behavior.

In the appended FIG. 3, the doctor blade impression is characterized colorimetrically and compared to a comparable aluminum pigment (Stapa MEX 2156, $d_{90}$:25 µm, $d_{50}$:16 µm and $d_{10}$:9 µm; silver dollar pigment). The brightness L* has been applied against the viewing angle relative to the reflection angle (angle of incidence of 45°). What becomes apparent is the very much darker behavior of the iron pigment across all viewing angles.

The metallic "flop" is the significant decrease of the brightness L* near the glancing angle from higher angles. A measure for the flop developed by firm DuPont from brightness values is represented by the following equation:

$$\text{Flop index} = 2.69 \times \frac{(L^*_{15°} - L^*_{110°})^{1.11}}{(L^*_{45°})^{0.86}}$$

Flop values result for the compared examples of 17.5 for aluminum pigments an 18.9 for the iron pigments. The iron pigment thus has a higher flop.

Dispersed into molten PVC, the iron particles can be oriented by applying an external magnetic field as long as the PVC is in its molten state. Decorative light/dark patterns that appear quasi three-dimensional are obtained as a result of the orientation.

EXAMPLE 2

100 g reduced carbonyl iron powder as in Example 1 are entered into a ball mill of dimensions 30 cm×25 cm, which is half-filled with 1.5 mm diameter steel balls. Added to this are 0.56 kg white spirit and 6 g stearic acid. The mill is then closed and rotated for six hours at 90 revolutions per minute. The mill is then emptied, the ground product is washed with white spirit and separated from the grinding means.

The iron pigment is printed as a dispersion in a gravure press with a cylinder, with a gravure screen with 70 dots/cm. High-gloss printing patterns are obtained, with a platinum-like metallic hue that has so far been unknown in the printing industry.

EXAMPLE 3

100 g reduced carbonyl iron powder as in Example 1 are entered into a ball mill of dimensions 30 cm×25 cm, which is half-filled with 1.5 mm diameter steel balls. Added to this are 0.56 g white spirit and 6 g octanophosphonic acid $((HO)_2OP-(C_8H_{17}))$.

The mill is then closed and rotated for six hours at 90 revolutions per minute. The mill is then emptied, the ground product is washed with white spirit and separated from the grinding medium. The obtained pigment displays a specific luster and high magnetic permeability. The average particle size of the powders is measured as 14 $\mu$m by laser beam refraction (Cilas measurements). Examinations with the scanning electron microscope reveal a diameter-to-thickness ratio of the flakes of approximately 70:1.

If the pigment is dispersed into a cellulose nitrate lacquer solution with a weight ratio of 20% and wiped with a doctor blade, the coating displays a high covering power and a titanium-like metallic luster.

EXAMPLE 4

100 g reduced carbonyl iron powder by firm BASF AG Ludwigshafen with the designation "Carbonyleisenpulver CN" with an average particle size of 5.5 $\mu$m (d10 value 3.5 $\mu$m, d90 value 15 $\mu$m), iron content 99.8% (C≦0.006%, NL<0.01%, O=0.18%) are entered into a ball mill of dimensions 30 cm×25 cm, which is half-filled with 1.5 mm diameter steel balls. Added to this are 0.56 liters white spirit and 1 g oleic acid.

The mill is then closed and rotated for six hours at 58 revolutions per minute. Afterwards the mill is emptied, the grinding product is washed with white spirit and separated from the grinding medium.

The obtained effect pigment displays a high metallic luster and the magnetic permeability of soft iron powder. The average particle size of the flake shaped iron oxide is 15 $\mu$m, as determined by laser beam refraction (Cilas measurements). Scanning electron microscope images were used to determine a diameter-to-thickness ratio of the flakes of approximately 50:1.

EXAMPLE 5

100 g reduced carbonyl iron powder by firm ISP, Wayne, N.J. with the designation R-1510, iron content 99.7%, average particle size 8.2 $\mu$m, is ground under conditions as in Example 4.

The obtained product with metallic luster and high magnetic permeability is magnetically separated from the grinding medium, filtered and subsequently stirred for over one hour in 1 liter 0.1% aqueous $H_3PO_4$ solution. The flake shaped iron pigment is subsequently filtered and dried in the drying chamber at 95° C. The product is not susceptible to rust for a period of 60 days.

EXAMPLE 6

350 g of the passivated iron effect pigment produced in Example 4 is entered into a heatable technical college mixer with a capacity of 10 liters and kept in motion with mixing means at 100° C. With the aid of a carrier gas flow (300 l/h, N2 as carrier gas), 3-aminopropyl trimethoxisilane (AMMO) and water are passed into the mixer using an evaporator. After 30 minutes the effect pigment is removed from the mixer.

The effect pigment, which is coated with silane on all sides, displays a good corrosion resistance in water lacquers and does not reveal any corrosion effects over a period of 60 days.

EXAMPLE 7

90 g iron pigments, as produced in Example 2, are dispersed in 300 ml isopropanol in a 1-liter laboratory reactor and brought to the boil. One adds 20 g tetraethoxysilane and 5 minutes later 11.6 g distilled water. Afterwards 9.6 g 25% aqueous $NH_4OH$ solution are passed in over the course of 2 hours and the mixture is allowed to boil for another 4 hours. The reaction mixture is then cooled down, stirred overnight, filtered off by suction the next morning and dried in the vacuum drying chamber at 90° C. The product has a $SiO_2$ content of 5.8%, which corresponds to a $SiO_2$ conversion yield of 96%. In standard run tests, the product shows an excellent run resistance and is thus suitable for aqueous lacquer systems.

What is claimed is:

1. A flake shaped iron pigment, wherein the pigment is produced from reductively treated carbonyl iron powder.

2. A flake shaped iron pigment according to claim 1, produced from reductively treated carbonyl iron powder of at least 99.0% purity.

3. A flake shaped iron pigment according to claim 1, wherein it has a particle size of the carbonyl iron powder of 0.5 to 100 $\mu$m.

4. A flake shaped iron pigment according to claim 1, wherein it has an average particle size of the iron flakes of 5 to 100 $\mu$m, and average thicknesses of 500 to 30 $\mu$m.

5. A flake shaped iron pigment according to claim 1, wherein the iron pigment is coated with a passivating inhibitor and/or anticorrosive protection coating.

6. A flake shaped iron pigment according to claim 5, wherein the passivating anticorrosive protection coating is composed of silicon oxide, zirconium oxide, aluminum oxide/hydroxide, phosphate, phosphate, chromium oxide, borate or mixtures of the same.

7. A flake shaped iron pigment according to claim 5, wherein the inhibitor coating is composed of fatty acids, carboxylic acid derivatives, organtic phosphates and phosphonates and their esters, organtically functionalized silanes, aliphatic or cyclic amines, aliphatic and aromatic nitro compounds, oxygen-containing, sulfur-containing or nitrogen-containing heterocycles, sulfur/nitrogen compounds of higher ketones, aldehydes and alcohols, thiols, b-diketones, b-ketoesters, or mixtures of the same.

8. A method for the production of pigments according to claim 1, wherein the dry or wet grinding of reductively treated carbonyl iron powder is in the presence of auxiliary grinding agents.

9. A method for the production of a flake shaped iron pigment, wherein dry or wet grinding of reductively treated carbonyl iron powders is carried out in the presence of auxiliary grinding agents and/or inhibitors and/or anticorrosive compounds.

10. A method for the production of a flake shaped iron pigment, wherein wet or dry grinding of reductively treated carbonyl iron powder is carried out with subsequent application of an anticorrosive barrier.

11. The flake shaped iron pigment of claim 3 wherein said particle size of the carbonyl iron powder is 1–60 $\mu$m.

12. The flake shaped iron pigment according to claim 4 wherein said average particle size of the iron flakes is 6–60 $\mu$m.

13. The flake shaped iron pigment according to claim 4 wherein said average thickness is 200–40 $\mu$m.

14. The flake shaped iron pigment according to claim 5 wherein said inhibitor coating is over said passivating anticorrosive protection layer and the inhibitor coating is composed of fatty acids, carboxylic acid derivatives, organic phosphates and phosphonates and their esters, organically functionalized silanes, aliphatic or cyclic amines, aliphatic and aromatic nitro compounds, oxygen-containing, sulfur-containing or nitrogen-containing heterocycles, sulfur/nitrogen compounds of higher ketones, aldehydes and alcohols, thiols, b-diketones, b-ketoesters or mixtures of the same.

15. The flake shape iron pigment of claim 5 wherein said anticorrosive protection coating is applied over said inhibitor coating, and said anti-corrosive protection coating is composed of silicon oxide, zirconium oxide, aluminum oxide/hydroxide, phosphate, phosphite, chromium oxide, borate or mixtures of the same.

16. In a method of adding a pigment to paint, a lacquer, a plastic or a cosmetic to provide pigmentation thereto, the improvement wherein said pigment is the flake shaped iron pigment of claim 1.

17. In a method of printing, comprising applying a pigment to a substrate, the improvement wherein said pigment is the flake shaped iron pigment of claim 1.

18. In a method of providing a reflective coating, comprising applying a reflective pigment to a surface of a substrate, the improvement wherein said reflector material is the flake shaped iron pigment of claim 1.

19. In a method of providing a security printed article comprising applying a security print to said article, the improvement wherein said security print is a printable magnetizable effect pigment comprising the flake shaped iron pigment of claim 1.

* * * * *